United States Patent
Mukherjee

(10) Patent No.: US 10,616,920 B1
(45) Date of Patent: Apr. 7, 2020

(54) SYSTEM AND METHOD OF UPLINK BANDWIDTH PART MANAGEMENT IN UNLICENSED SPECTRUM

(71) Applicant: CHARTER COMMUNICATIONS OPERATING, LLC, St. Louis, MO (US)

(72) Inventor: Amitav Mukherjee, Elk Grove, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 23 days.

(21) Appl. No.: 16/144,643

(22) Filed: Sep. 27, 2018

(51) Int. Cl.
  *H04W 74/04* (2009.01)
  *H04W 72/04* (2009.01)
  *H04W 72/12* (2009.01)
  *H04W 72/14* (2009.01)
  *H04W 16/14* (2009.01)

(52) U.S. Cl.
  CPC ........... *H04W 74/04* (2013.01); *H04W 16/14* (2013.01); *H04W 72/042* (2013.01); *H04W 72/0453* (2013.01); *H04W 72/1284* (2013.01); *H04W 72/14* (2013.01)

(58) Field of Classification Search
  CPC . H04W 74/04; H04W 72/0453; H04W 72/14; H04W 72/042; H04W 16/14; H04W 72/1284
  See application file for complete search history.

(56) References Cited

U.S. PATENT DOCUMENTS

| | | |
|---|---|---|
| 2011/0205981 A1 | 8/2011 | Koo et al. |
| 2018/0123765 A1 | 5/2018 | Cao et al. |
| 2018/0183551 A1 | 6/2018 | Chou et al. |
| 2019/0342911 A1* | 11/2019 | Talarico ............... H04L 1/0013 |

OTHER PUBLICATIONS

Convida Wireless "Autonomous Uplink Transmission in NR Unlicensed", 3GPP TSG-RAN WG1 Meeting #94, Gothenburg, Sweden, Aug. 20-24, 2018.

* cited by examiner

*Primary Examiner* — Walter J Divito
(74) *Attorney, Agent, or Firm* — Meagher Emanuel Laks Goldberg & Liao, LLP

(57) ABSTRACT

Various embodiments comprise systems, methods, architectures, mechanisms, apparatus, computer implemented method and/or framework configured to provide uplink scheduling/managing of multiple bandwidth parts (BWPs) for user equipment (UE) configured to transmit via unlicensed spectrum such as 5G New Radio in unlicensed spectrum (NR-U).

20 Claims, 4 Drawing Sheets

SYSTEM AND METHOD OF UPLINK BANDWIDTH PART MANAGEMENT IN UNLICENSED SPECTRUM

FIELD OF THE DISCLOSURE

The present disclosure relates generally to fifth generation telecommunications systems and, more particularly, to uplink bandwidth part management in unlicensed spectrum.

BACKGROUND

Long Term Evolution (LTE) Licensed Assisted Access (LAA) and its enhancements/further enhancements (eLAA/FeLAA) were introduced in 3GPP Releases 13-15 to specify downlink (DL) and uplink (UL) LTE operation in unlicensed spectrum, primarily 5 GHz. A similar effort is under way in Rel-16 for 5G New Radio in unlicensed spectrum (NR-U).

User equipment (UE) can be configured with up to four bandwidth parts (BWPs) in the uplink with a single uplink BWP being active at a given time. UL BWP switching is indicated via Downlink Control Information (DCI) carrying UL scheduling grants sent by the next generation Node-B (gNB). If a UE is configured with a supplementary uplink, the UE can in addition be configured with up to four BWP in the supplementary uplink with a single supplementary uplink BWP being active at a given time. The UE shall not transmit via the Physical Uplink Shared Channel (PUSCH, which is used to transfer RRC signaling messages, application data and Uplink Control Information (UCI)), the Physical Uplink Control Channel (PUCCH, which is used to transfer UCI), or the Sounding Reference Signal (SRS, which is used by the gNB to estimate channel quality) outside of an active BWP.

Unfortunately, the various standards documents do not address uplink scheduling/management issues associated with multiple BWP UE configurations.

SUMMARY OF THE INVENTION

Various deficiencies in the prior art are addressed below by the disclosed systems, methods, architectures, mechanisms, apparatus, computer implemented method and/or framework configured to provide uplink scheduling/managing of multiple bandwidth parts (BWPs) for user equipment (UE) configured to transmit via unlicensed spectrum such as 5G New Radio in unlicensed spectrum (NR-U).

One embodiment of the invention comprises an apparatus or method for managing user equipment (UE) access to New Radio in unlicensed spectrum (NR-U) by configuring, via a NB/gNB, the UE with two or more simultaneous active uplink (UL) bandwidth parts (BWPs), with at least one UL BWP reserved for UE transmission of at least a portion of a scheduled uplink (SUL) data or control channel, and at least one of the remaining UL BWPs reserved for UE transmission of autonomous uplink (AUL) data or control channel, wherein the UE is further configured to suspend AUL BWP transmission during SUL BWP transmission.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Within the context of 5G communications systems, part of the initial interaction between a UE (e.g., a mobile device, Internet of things device and the like) and the gNB (e.g., a 5G "base station") in communication with the UE is the establishment of various operational parameters, including which uplink (UL) bandwidth part (BWP) will be used by the UE to transmit data to the gNB.

Figure 1:
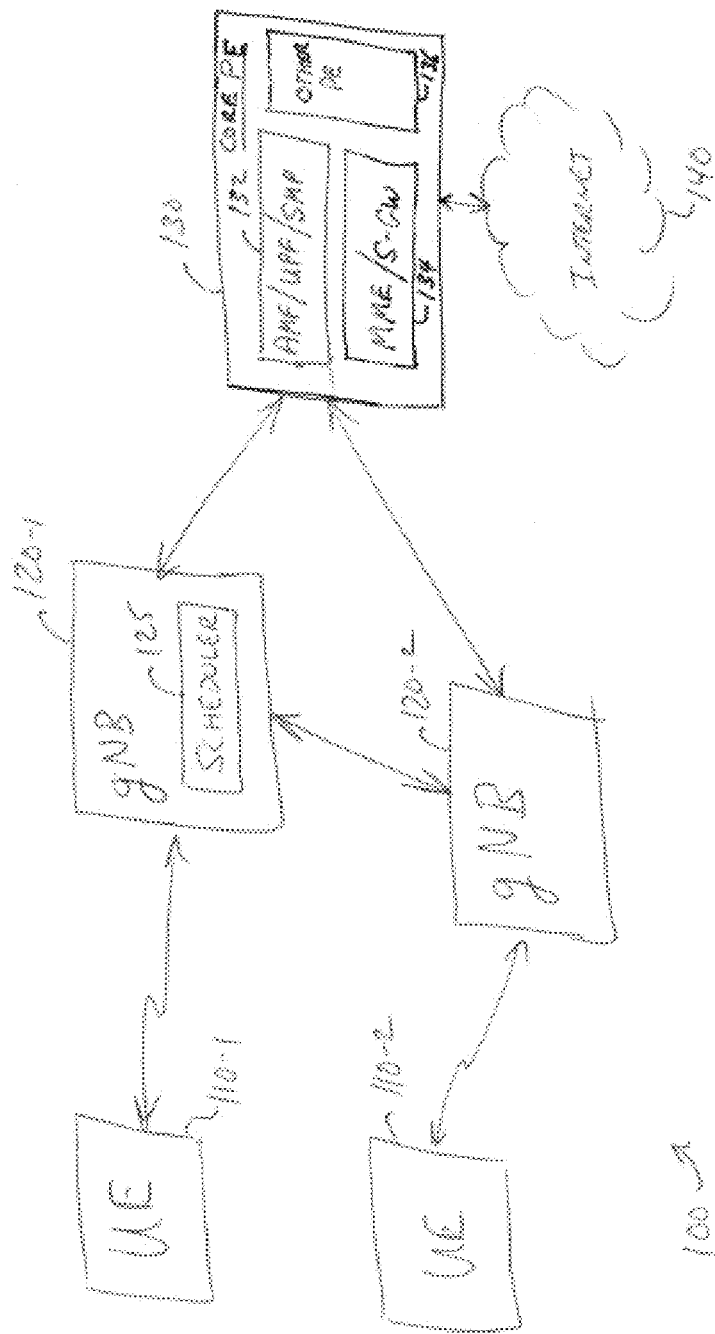
FIG. 1 depicts a simplified diagram of a portion of a next generation network suitable for use in describing the embodiments.

FIG. 1 depicts a simplified diagram of a portion of a next generation network suitable for use in describing the embodiments. Specifically, FIG. 1 depicts a portion 100 of a 5G network wherein a plurality of user equipment (UE), illustratively to UE denoted as 110-1 and 110-2 (collectively UE 110, where each UE 110 may comprise a mobile device, IoT device or other 5G UE) receives 5G services via a Next Generation Radio Access Network (NG-RAN) including a plurality of next generation Node-Bs (gNBs), illustratively two gNBs denoted as 120-1 and 120-2 (collectively gNBs 120). The gNBs 120 communicate with core provider equipment, which may comprise 5G Core (5GC) elements such as a Accessibility and Mobility Function, User Place Function, Session Management Function (AMF/UPF/SMF) and related elements 132, LTE Evolved Packet Core (EPC) elements such as Mobility Management Entity (MME), Serving Gateway (MME/S-GW) and related elements 134 and/or other PE management/routing elements 136, which are coupled to a network such as the Internet 140 and control delivery of 5G, LTE and/or other services to the UE 110 via the gNBs 120 (NBs 120 in the case of LTE).

It is noted that first gNB 120-1 is depicted as including a schedule 125, which scheduler is operable to perform various functions including the scheduling of UE scheduled uplink BWP transmission and autonomous uplink BWP transmission in accordance with the various embodiments. Within the context of the simplified diagram of FIG. 1, for scheduling purposes the first gNB 120-1 operates as a central gNB whereas second gNB 120-2 operates as a distributed gNB; specifically, the scheduler 125 associated with central gNB 120-1 is used to perform the various scheduler functions for the UE 110 attached to the distributed gNB 120-2.

Figure 2:
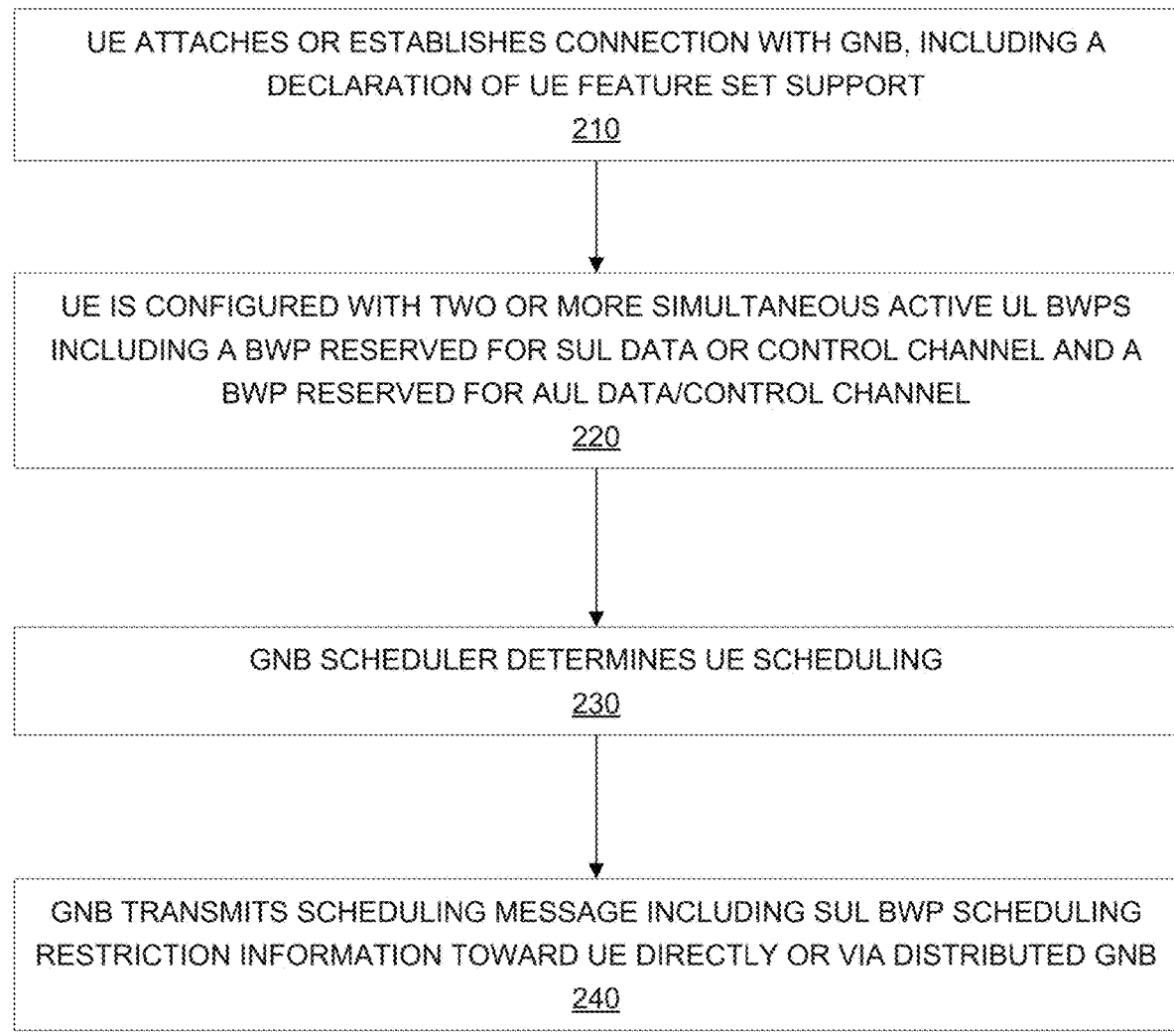
FIG. 2 depicts a flow diagram of a method of configuring UE according to an embodiment.

FIG. 2 depicts a flow diagram of a method of configuring UE according to an embodiment. In particular, the method 200 of FIG. 2 is directed to configuration of one or more UE 110 by respective primary or distributed gNB/NB 120 to configure simultaneous active scheduled UL (SUL) BWPs and autonomous UL (AUL) BWPs in an efficient manner as discussed herein with respect to the various embodiments.

At step 210, the UE 110 attaches or establishes connection with a gNB, including a declaration of UE feature set support. That is, upon connecting to a gNB 120 of the NG-RAN, the UE 110 indicate such as via a feature set support message, declaration or other mechanism which standard or optional feature sets are supported by the UE. In essence, the UE 110 indicates it capabilities to the gNB 120 such that the gNB 120 and/or AMF/UPF/SMF 130 may provide services conforming to the capabilities of the UE 110.

UE capabilities may include various capabilities such as an ability to be configured with one or more active BWPs for scheduled UL (SUL) BWP transmissions and one or more autonomous UL (AUL) BWP transmissions. For example, assuming each of a plurality of UEs is allocated a black van with, that black bandwidth may be divided equally or unequally among, illustratively, one to four BWPs (e.g., a 400 MHz allocation divided among one, two, three of four BWPs) configured for that UE. Further, assuming a group of UEs together is allocated a total amount of bandwidth, that total amount bandwidth may be divided equally or unequally among the UEs of the group of UEs, any specific bandwidth allocated to an individual UE may be divided equally or unequally among, illustratively, one to four BWPs configured for that UE. Furthermore, different types of you we may be allocated different amounts of bandwidth. Mobile phones almost certainly require more bandwidth than Internet of things (IoT) sensors/transmitters, At step 220, the UE is configured with two or more simultaneous active UP BWPs, including at least one BWP reserved for SUL data or control channel information, and one BWP reserved for AUL data or control channel information. For systems in which UE may be configured with up to four BWPs, if configuring the remaining two BWPs is desired then they may be configures as either SUL or AUL. A single uplink BWP is to be active at any given time. Further, for systems using a supplementary uplink and an ability to configure UEs with, illustratively, up to four supplementary uplink BWPS, the method 200 further contemplates that the UE is optionally configured with two or more simultaneous active UP BWPs in the supplementary uplink, including at least one BWP reserved for SUL data or control channel information, and one BWP reserved for AUL data or control channel information. Generally speaking, the UE is configured to avoid transmitting via PUSCH, PUCCH or SRS outside an active BWP.

At step 230, UE scheduling is determined such as by a gNB/NB scheduler 125, and at step 240, the gNB/NB transmits the determined schedule including SUL BWP scheduling restriction information toward the UE directly from the gNB/NB associated with the UE, or from a central gNB/NB via the distributed gNB/NB associated with the UE. You a In various embodiments, UL BWP switching is indicated by the DCI carrying UL scheduling grant sent by the gNB. The four code points in that DCI field map to the RRC-configured BWP-ID as follows: For up to 3 configured BWPs (in addition to the initial BWP) the DCI code point is equivalent to the BWP ID (initial=0, first dedicated=1, . . . ). If the NW configures 4 dedicated bandwidth parts, they are identified by DCI code points 0 to 3. In this case it is not possible to switch to the initial BWP using the DCI field.

For configured grants, the PUSCH resource allocation is semi-statically configured by higher layer parameter ConfiguredGrantConfig in BWP information element. The configured grant PUSCH transmission takes place on the same UL BWP that is the current active UL BWP. This implies that both scheduled and autonomous PUSCH transmissions utilize the same UL BWP until the scheduled UL is indicated to switch to a new BWP.

Allowing consecutive configured grant resources in time without any gaps in between the resources and non-consecutive configured grant resources (not necessarily periodic) with gaps in between the resources is beneficial and is used in various embodiments within the context of NR in unlicensed spectrum.

In various embodiments, it is contemplated that both scheduled and autonomous PUSCH transmissions utilize the same UL BWP until the PUSCH transmission is indicated via DCI to switch to a new BWP, with only one get UL BWP is active at a time.

In various embodiments, new DCI formats are defined to provide the various indications/signaling as discussed herein such that the UE is configured to operate in accordance with the various embodiments. There are numerous different formats, bit combinations and the like that may be used for such signaling.

In one embodiment, modifications to the DCI format defined in, illustratively, section 7.3 of the Third Generation Partnership Project (3GPP) Technical Specification (TS) 38.212 v15.2.2.0 (2018-06), are augmented by defining new DCI formats 0_0A and 0_1A (or modifying formats 0_0 and 0_1, or some other format/field suitable for use in communicating the relevant information not the UE) to schedule PUSCH. For example, the following new fields are used in various embodiments (it is noted that other bits, fields, bit/fields sizes and the like may be used within the context of the various embodiments):

(1) A 1-bit flag/field for indicating whether to activate or deactivate multiple UL BWP operation. This may be thought of as a "secondary BWP activation/deactivation" 1-bit flag or field used to enable the configuration of BWPs at a UE, such as by indicating a default/deactivated state via a first logic setting (e.g., "0") in which the UE is configured to have only one UL BWP, and indicating an active state by a second the logic setting (e.g., "1") in which the UE is configured to have more than one UL BWPs, wherein the relevant logic settings may be reversed if desired.

(2) A multiple bit flag/field (e.g., a 3-bit flag/field) for defining secondary BWP suspension, illustratively a time duration (in slots with range 1-8) within which UE transmission of secondary UL BWP (e.g., the AUL BWP) is suspended. This may be thought of as a "secondary UL BWP suspension period" or "SUL BWP priority/activation period" or "AUL BWP lockout/deactivation period" and the like, during which time period no AUL BWP data or control transmissions are to be made by the UE being configured.

In various embodiments, unlicensed spectrum operation is improved such as by providing that a NR-U UE is allowed to operate on two active UL BWPs at the same time; one BWP for scheduled UL and a particular set of HARQ processes, the other BWP for Type-1 configured grants with a different set of HARQ processes.

For example, various embodiments the two UL BWPs or chosen by the gNB based on existing congestion levels of the unlicensed band. By spreading PUSCH transmissions over two non-overlapping BWPs, there is an increase of opportunities for channel access. Furthermore, separating the BWPs between scheduled and autonomous PUSCH is a simple way to eliminate collisions between such transmissions in the same slot, and allows the gNB to schedule all UL interlaces on the first BWP without having to consider potential interference from Type-1 configured grant transmissions.

It should be noted that this does not imply that the UE simultaneously transmits both SUL and AUL BWPs at the same time, nor does this imply a requirement to monitor more than one active DL BWP. For example, if at slot k the UE receives a dynamic scheduling grant for slot k+n on BWP A, in slots k+1 to k+n−1 it can perform LBT and autonomous transmissions on BWP B. The UE then switches to BWP A for the scheduled PUSCH, after which it may switch back to BWP B if it has pending configured grant HARQ processes for transmission. It should be noted that the gNB retains full control over which UL BWP(s) it expects the UE to transmit.

Thus, various embodiments provide that NR-U UEs operate on two active UL BWPs at the same time; one BWP for scheduled UL and a particular set of HARQ processes, the other BWP for configured grants with another set of HARQ processes. In this manner the various embodiments realize benefits such as increased channel access opportunities over a wider portion of the unlicensed band, and eliminating collisions between dynamically scheduled and autonomous transmissions on the same resources.

Figure 3:
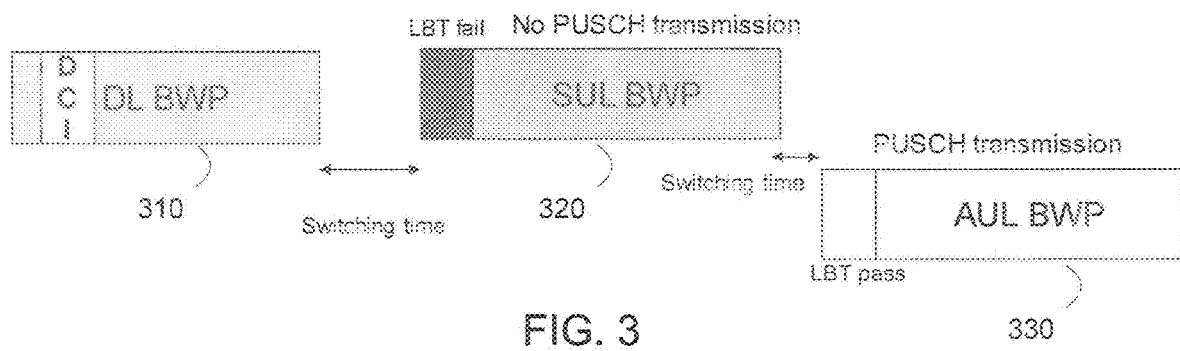
FIGS. 3-4 graphically depict prioritized SUL transmissions in accordance with various embodiments.

FIG. 3 graphically depicts prioritized SUL transmissions in accordance with one embodiment. Specifically, FIG. 3 depicts a downlink BWP 310 including DCI information received by a UE during a first one more time slots, followed after a switching time by a SUL BWP transmission 320 from the UE during which there are no other PUSCH transmissions, followed after a switching time by a AUL BWP transmission 330.

FIG. 3 graphically depicts an embodiment where a UE is configured with one or more active BWPs for scheduled uplink (SUL) transmissions and one or more active UL BWPs for autonomous uplink (AUL) transmissions. It is assumed that separate sets of Hybrid Automatic Repeat Request (HARQ) process identifiers are allocated for each of the SUL and AUL transmissions.

To simplify this discussion, it is assumed that a UE will transmit one active S UL BWP in one active AUL BWP, where the SUL BWP transmission is prioritized. In this case, new L1 signaling or DCI-based signaling is to instruct the UE to temporarily deactivate the AUL BWP during the time that the SUL BWP is active.

In one embodiment, a scheduling message transmitted to the UE (e.g., at step 230 of the method 200 of FIG. 2) includes signaling indicative of a duration of the AUL BWP deactivation and/or a reconfiguration of one or more parameters of the AUL BWP such as an interlace parameter. Generally speaking, the signal provides information to the UE configured to cause the UE to deactivate AUL BWP transmission during a time. Actually or likely to be associated with SUL BWP transmission.

In one embodiment, the SUL scheduling grant may indicate a first timing indication to attempt UL transmission of a particular HARQ process, followed by a second indication to reattempt transmission of that HARQ process of the AUL BWP if the first attempt failed due to unsuccessful Listen-before Talk (LBT), such as depicted in FIG. 3.

In various embodiments, it is contemplated that the gNB configures a number of active UL BWPs as well as the switching between them.

Figure 4:
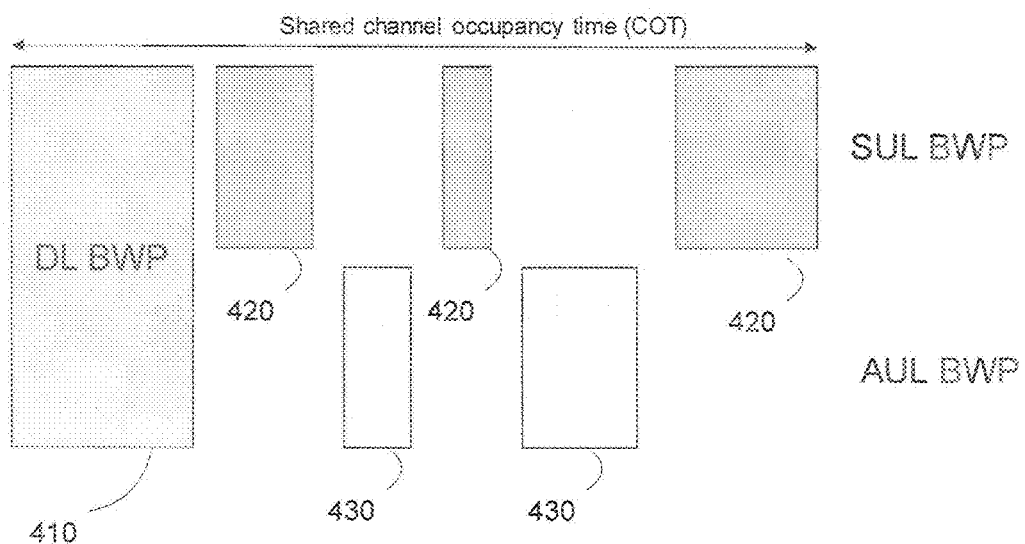

FIG. 4 graphically depicts prioritized SUL transmissions in accordance with one embodiment. Specifically, FIG. 4 graphically depicts an embodiment where a UE is configured with one or more active BWPs for scheduled uplink (SUL) transmissions and one or more active UL BWPs for autonomous uplink (AUL) transmissions, and where the UE is able to utilize both types of BWPs in a time-division multiplex manner.

Specifically, FIG. 4 depicts a downlink BWP 410 received by a UE during a first one more time slots, followed by interleaved portions of an SUL BWP 420 and an AUL BWP 430. In particular, FIG. 4 depicts a case where gaps are present in the SUL transmission on the SUL BWP. During the gaps, the UE is allowed to transmit AUL HARQ processes on the AUL BWP, which transmissions may or may not overlap with the scheduled SUL BWP. Furthermore, transmissions on one or both UL BWP's may occur within a shared channel occupancy time (COT) initiated by the gNB on the DL. The gaps are preferably long enough to a common eight switching times (e.g., a few symbols within a 14 symbol timeslot) between the active UL BWPs.

Thus, FIG. 4 graphically depicts an embodiment wherein AUL BWP transmission may opportunistically occur during unused portions of the scheduled SUL BWP.

Figure 5:
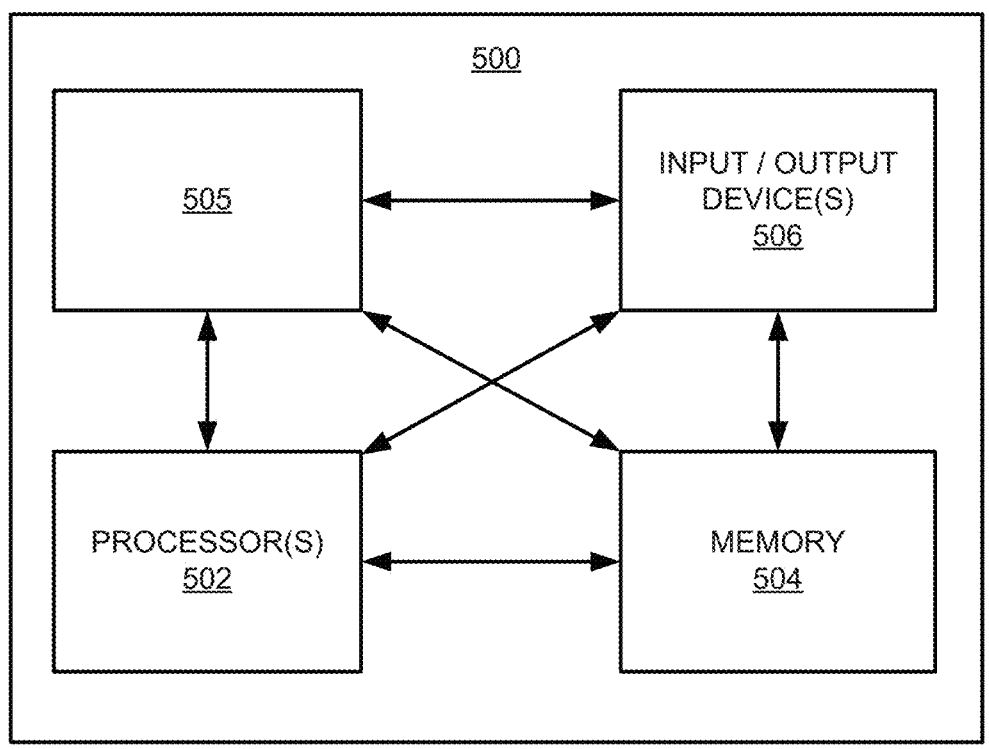
FIG. 5 depicts a high-level block diagram of a computing device suitable for use in various embodiments.

FIG. 5 depicts a high-level block diagram of a computing device suitable for use in implementing various devices for performing functions such as described herein, such as implementing one or more of the functional elements described herein with respect to the various figures. For example, functional elements such as UE 110, gNB 120, AMF/UPF/SMF) element 130 and the like may be implemented using the general purpose computing device 500 depicted herein with respect to FIG. 5.

As depicted in FIG. 5, computing device 500 includes a processor element 503 (e.g., a central processing unit (CPU) or other suitable processor(s)), a memory 504 (e.g., random access memory (RAM), read only memory (ROM), and the like), a cooperating module/process 505 (e.g., network transceivers), and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 505 can be loaded into memory 504 and executed by processor 503 to implement the functions as discussed herein. Thus, cooperating process 505 (including associated data structures) can be stored on a computer readable storage medium, e.g., RAM memory, magnetic or optical drive, solid state drive and the like.

It will be appreciated that computing device 500 depicted in FIG. 5 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for managing user equipment (UE) access to New Radio in unlicensed spectrum (NR-U), comprising:
configuring, via a gNB, the UE with two or more simultaneous active uplink (UL) bandwidth parts (BWPs), with at least one UL BWP reserved for UE transmission of at least a portion of a scheduled uplink (SUL) data or control channel, and at least one of the remaining UL BWPs reserved for UE transmission of autonomous uplink (AUL) data or control channel, wherein said UE is further configured to suspend AUL BWP transmission during SUL BWP transmission.

2. The method of claim 1, wherein configuring the UE with two or more simultaneous active uplink (UL) bandwidth parts (BWPs) is indicated via a state of a Downlink Control Information (DCI) format flag, and a time period for suspending AUL BWP transmission is indicated via a multiple bit setting within a DCI format field.

3. The method of claim 1, further comprising:
transmitting, via the gNB, a UE scheduling grant message defining one or more time slots reserved for UE transmission of at least a portion of a scheduled uplink (SUL) bandwidth part (BWP) data, the UE scheduling grant message further configured to cause the UE to disable transmission of any autonomous uplink (AUL) BWP data during the reserved time slots.

4. The method of claim 3, wherein said UE scheduling grant message is transmitted toward the UE via a Downlink Control Information (DCI).

5. The method of claim 3, wherein said UE scheduling grant message is further configured to cause the UE to enable transmission of any AUL BWP data during time slots or portions thereof not included within the reserved time slots.

6. The method of claim 1, further comprising:
configuring, via a gNB, the UE with two or more simultaneous supplementary active uplink (UL) bandwidth parts (BWPs), with at least one supplementary UL BWP reserved for UE transmission of at least a portion of a scheduled supplementary uplink (SUL) data or control channel, and at least one of the remaining supplementary UL BWPs reserved for UE transmission of supplementary autonomous uplink (AUL) data or control channel, wherein said UE is further configured to suspend supplementary AUL BWP transmission during supplementary SUL BWP transmission.

7. The method of claim 3, wherein the UE scheduling message is configured to cause the UE to disable transmission of any autonomous uplink (AUL) BWP data during the reserved time slots.

8. The method of claim 3, wherein the UE scheduling message is configured to cause the UE to multiplex the transmission of SUL BWP portions and AUL BWP portions.

9. The method of claim 3, wherein the scheduling grant message is generated by a scheduler at the gNB.

10. The method of claim 1, wherein the gNB comprises one of a plurality of distributed gNBs in communication with a central gNB, and the scheduling grant message is generated by a scheduler at the central gNB.

11. The method of claim 2, wherein the time period for suspending AUL BWP transmission comprises a time period sufficient to transmit an entire SUL BWP.

12. The method of claim 2, wherein the time period for suspending AUL BWP transmission comprises a time period sufficient to transmit a portion of a SUL BWP.

13. The method of claim 1, wherein the UE is configured to opportunistically transmit AUL BWP at any time when a SUL BWP is not being transmitted.

14. The method of claim 1, wherein the UE is configured to multiplex transmission of SUL BWP portions and AUL BWP portions.

15. An apparatus for managing user equipment (UE) access to New Radio in unlicensed spectrum (NR-U), the apparatus comprising a processor configured for:
configuring, via a NB/gNB, the UE with two or more simultaneous active uplink (UL) bandwidth parts (BWPs), with at least one UL BWP reserved for UE transmission of at least a portion of a scheduled uplink (SUL) data or control channel, and at least one of the remaining UL BWPs reserved for UE transmission of autonomous uplink (AUL) data or control channel, wherein said UE is further configured to suspend AUL BWP transmission during SUL BWP transmission.

16. The apparatus of claim 15, wherein the processor is further configure for configuring the UE with two or more simultaneous active uplink (UL) bandwidth parts (BWPs) is indicated via a state of a Downlink Control Information (DCI) format flag, and a time period for suspending AUL BWP transmission is indicated via a multiple bit setting within a DCI format field.

17. The apparatus of claim 15, wherein the processor is further configure for transmitting, via the NB/gNB, a UE scheduling grant message defining one or more time slots reserved for UE transmission of at least a portion of a scheduled uplink (SUL) bandwidth part (BWP) data, the UE scheduling grant message further configured to cause the UE to disable transmission of any autonomous uplink (AUL) BWP data during the reserved time slots.

18. The apparatus of claim 15, wherein the apparatus comprises a Long Term Evolution (LTE) Node-B or 5G gNB.

19. The apparatus of claim 15, wherein the NB/gNB comprises one of a plurality of distributed NBs/gNBs in communication with a central NB/gNB, and the scheduling grant message is generated by a scheduler at the central gNB.

20. A tangible and non-transient computer readable storage medium storing instructions which, when executed by a computer, adapt the operation of the computer to provide a method for managing user equipment (UE) access to New Radio in unlicensed spectrum (NR-U), the method comprising:
configuring, via a NB/gNB, the UE with two or more simultaneous active uplink (UL) bandwidth parts (BWPs), with at least one UL BWP reserved for UE transmission of at least a portion of a scheduled uplink (SUL) data or control channel, and at least one of the remaining UL BWPs reserved for UE transmission of autonomous uplink (AUL) data or control channel, wherein said UE is further configured to suspend AUL BWP transmission during SUL BWP transmission.

* * * * *